(12) United States Patent
Liu et al.

(10) Patent No.: US 7,822,583 B2
(45) Date of Patent: Oct. 26, 2010

(54) METHOD OF BATCH FALLING STRAND DEVOLATILIZER

(75) Inventors: Tai-Kang Liu, Longtan Township, Taoyuan County (TW); Chi-Fa Hsieh, Chungli (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 858 days.

(21) Appl. No.: 11/785,110

(22) Filed: Apr. 16, 2007

(65) Prior Publication Data

US 2008/0255338 A1    Oct. 16, 2008

(51) Int. Cl.
*G06F 17/50* (2006.01)
(52) U.S. Cl. .............................. 703/1; 159/2.1; 159/43.1
(58) Field of Classification Search ....................... 703/1
See application file for complete search history.

(56) References Cited

U.S. PATENT DOCUMENTS 3,884,766 A * 5/1975 Bir et al. ..................... 202/173
3,928,300 A * 12/1975 Hagberg ..................... 528/501
3,966,538 A * 6/1976 Hagberg ..................... 159/2.1
4,294,652 A * 10/1981 Newman ..................... 159/2.1
4,529,320 A * 7/1985 Mehta et al. ................. 366/75
4,934,433 A * 6/1990 Aboul-Nasr ............... 159/43.1

* cited by examiner

*Primary Examiner*—Mary C Jacob
(74) *Attorney, Agent, or Firm*—Rosenberg, Klein & Lee

(57) ABSTRACT

A design method of batch falling strand devolatilizers is disclosed. The method includes following steps. Firstly, construct a database that contains data of batch falling strand devolatilizer vs. devolatilization of at least one kind of polymer. Then data in the database is substituted into a mass balance difference equation to get a backmixing parameter. When the backmixing parameter is zero or is approaching zero, a liquid diffusion stage efficiency equation having a film equation or a pool equation is integrated with the mass balance difference equation to get a devolatilization process efficiency equation. By optimizing of a theoretical value of the backmixing parameter, a theoretical value of the process efficiency from calculation of the devolatilization process efficiency equation approaches the value of the process efficiency. Then the theoretical value of the backmixing parameter is substituted into the devolatilization process efficiency equation for performing volume design of the batch falling strand devolatilizer.

9 Claims, 12 Drawing Sheets

METHOD OF BATCH FALLING STRAND DEVOLATILIZER

BACKGROUND OF THE INVENTION

The present invention relates to a design method of devolatilizers, especially to a design method of batch falling strand devolatilizers that is applied to a scale-up design of the batch falling strand devolatilizers so as to achieve preset high devolatilization efficiency of the batch falling strand devolatilizer.

US researchers Biesenberger, J. A. (Devolatilization of Polymers, Hanser Publishers, N.Y., 1983) and Biesenberger, J. A. and Sebastian, D. H. (Principles of Polymerization Engineering, Wiley-Interscience, NY., p.573-659, 1983) have reviewed principles of various devolatilizers applied in polymerization engineering industry. The later one has discussed the batch falling strand devolatilizer and has focused on microscopic theories such as fluid mechanics, heat transfer and mass transfer. However, the batch falling strand devolatilizer according to the present invention emphasizes macroscopic parameters of engineering design such as sizing of devolatilizers, polymer viscosity, recycles of batch operation and whole process efficiency.

Chinese scientists Li, G. et al. (Devolatilization of hydroxy-terminated polydimethylsiloxane in single-screw extruder, Hecheng Xiangjiao Gongye, 27(4), p. 205-208 (in Chinese), 2004, ISSN:1000-1255, Chemical Abstract 142: 115180) have studied parameters related to volatiles of polydimethylsiloxane (PDMS) with end hydroxyl group and found that temperature and vacuum level are the most important factors. They also got relationships among final amount of volatiles, flow rate and rotating speed. Yet the devolatilizer is a single-screw extruder that is different from the falling strand devolatilizer according to the present invention. Moreover, Biesenberger, J. A. (Polymer devolatilization: equipment theory, 37.sup.th Society of Plastic Engineer, ANTEC, New Orleans, p.972-978, 1979), Latinen, G. A.(Devolatilization and polycondensation process, ACS Series No. 34, Advances in Chemistry Series, American Chemical Society, p.235-246, 1962) and Powell, K. G. (Devolatilisation of PDMS gums: a performance comparison of co- and counter-rotating twin-screw extruders, Antec '94 Conference Proceedings, San Francisco, Calif, 1-5, May, 1994, Vol. I, p.234-8.012) have discussed design model of screw devolatilization extruders.

Recently, German researcher Nonnenmacher, S. (Numerical and experimental investigation of volatilization in statistical devolatilization apparatus, Fortschritt-Berichte VDI, Reihe 3: Verfahrenstechnik, 793, i-xviii, 1-158 (in German), 2003, VDI Verlag Gmbh, ISSN:0178-9503, Chemical Abstract 139:396407) has discussed theories and experiments of falling strand devolatilizers and flash evaporators. Both devolatilizers have no mechanical movement parts but use gaseous stripping agents. The design principles are different from the present invention.

In *Silicones*, Process Economics Program, Report No. 160, p.283, June, 1983, SRI International, Menlo Park, Calif. 94025 published by the Stanford Research Institute, Scheeline, H. W. and Chandwani, D. disclosed a flow chart of chemical equipments that shows thin-film evaporators are applied to silicon polymer manufacturing industry currently. The device is different from the batch falling strand devolatilizer according to the present invention.

Refer to U.S. Pat. No. 4,096,160—Continuous devolatilization of silanol-terminated silicone polymer, a devolatilization process is disclosed. An improved process is provided for preparing a linear diorganopolysiloxane fluid having terminal hydroxy groups, which is substantially free of cyclic polysiloxanes. In the process, a linear diorganopolysiloxane fluid containing lower boiling cyclic polysiloxanes is mixed with steam into an evacuated, tortuous, confined passageway to form a turbulent mixture that passed through the passageway. The vaporized mixture of steam and cyclics and the linear diorganopolysiloxane substantially free of cyclics are removed from the passageway, and the vaporized mixture of steam and cyclics is separated from the cyclic-free diorganopolysiloxane fluid. The system is different from the device of the present invention.

Refer to U.S. Pat. No. 4,430,461—Method of removing volatiles in the preparation of silicone compositions, a method of removing volatiles in the mixing of a high-temperature-vulcanizing silicone rubber composition is disclosed. The high-temperature-vulcanizing silicone rubber has a viscosity ranging from 1,000,000 to 300,000,000 centipoise so that the volatiles are removed by aspirator means connected to a Banbury-type mixing vessel for producing a devolatilized mixture. The design principles of the device and the present invention are far more different from each other. Furthermore, U.S. Pat. No. 3,960,802—Process for the manufacture of a one-component room-temperature vulcanizable silicone composition, and U.S. Pat. No. 4,528,324—Process for producing RTV silicone rubber compositions using a devolatilizing extruder both use devolatilizing extruders to perform mixing and devolatilization of a formulated room temperature vulcanizable silicone rubber composition. But the present invention is a concern of falling strand devolatilizer without any mechanical rotation.

Refer to U.S. Pat. No. 3,987,235—Devolatilization of alkenyl aromatic polymers, alkenyl aromatic polymers such as styrene polymers are devolatilized in a molten condition by the introduction of methanol and the volatiles removed under vacuum. U.S. Pat. No. 4,124,658—Devolatilization of styrene polymers with sulfonylhydrazides, discloses residual monomer from styrene-based polymers is removed by adding a sulfonylhydrazide to the polymer and heating the mixture to a temperature above the decomposition temperature of the sulfonylhydrazide used. In U.S. Pat. No. 5,861,474, contaminants in thermoplastic polymer are removed by introducing stripping agents such as $N_2$, $C_2H_4$, $CH_4$, $CO_2$ while U.S. Pat. No. 6,124,426 discloses a devolatilizing process by adding a blowing agents such as water, acetone, or methanol to a styrene/acrylonitrile copolymer (SAN)-containing volatile materials. In U.S. Pat. No. 6,211,331, stripping agents such as water, methanol or a solution of carbon dioxide in water are used for devolatilisation of a thermoplastic polymer, and U.S. Pat. No. 6,353,088 discloses a foaming agent such as water or alcohol that is immiscible with the polymers for removing volatile matters from aromatic vinyl polymers. Similarly, U.S. Pat. No. 6,410,683 shows that the polymer is mixed with stripping agent for the removal of impurities from a thermoplastic polymer.

In U.S. Pat. No. 6,740,691—Removal of volatile organic compounds from polymer dispersions, by introducing oxidisable sulphur compounds, free radical intiator and steam, emulsion and suspension polymerization is performed for removal of volatile organic compounds. In Taiwanese patent No. 402,612, a method to remove volatile materials from thermoplastic polymer by using water, methanol and acetone is disclosed. All above-mentioned patents improves the operation efficiency of devolatilization by introducing additives. The design of above patents and the design of the present invention are based on different principles.

U.S. Pat. No. 4,383,972 and U.S. Pat. No. 4,439,601 disclose design of a multiple stage flash evaporator. By lower pressure (or higher vacuum level) of lower-stream flash evaporator than pressure of upper-stream flash evaporator, continuous processes are performed for removing volatiles in polymers. U.S. Pat. No. 4,537,954 discloses removing volatile components continuously from the polymerization fluid composition in three stages. The lower stream the device is, the higher temperature and the vacuum level they are. In the third stage, devolatilization is carried out in the presence of a foaming agent. By control of temperature and pressure in each stage, volatile components are removed continuously. The design fundamental is different from that of the present invention.

As to U.S. Pat. No. 4,452,977—Process for the preparation of polymer melts which are substantially free of volatile components, U.S. Pat. No. 4,578,455—Process and apparatus for removing volatile constituents from polymer melts or pastes, U.S. Pat. No. 6,833,096—Method for removing water and other volatile components from polymer powders, and Taiwanese patent No. 307,709—Extrusion method and device thereof for removal of volatiles from solid-state resin, all reveal extruders for continuous devolatilization operations. The system for devolatiolization of above patents is different from the present invention.

U.S. Pat. No. 4,744,957 discloses an apparatus having a polymer discharge device provided with heating means and adapted to discharge a polymer charged therein in the form of a strand or film and so forth for removing the volatile matters from the polymers, is disclosed. However, this is a continuous flow process without mention a design method. U.S. Pat. No. 5,024,728 discloses similar devolatilization apparatus of the present invention that removes volatile constituents of liquid streams by vacuum and high temperature. The apparatus includes a vertical multi-tube heat exchanger disposed between devolatilizer and raw material and a static mixer is disposed inside the system. The system is for continuous processes and the design method is not mentioned. Therefore, the system is different from the present invention.

U.S. Pat. No. 4,865,689—Method and apparatus for evaporating the volatile components of a polymer and U.S. Pat. No. 7,060,788—Process for stripping monomers and other volatile constituents from polymer melts respectively discloses a thin-film evaporator without and with rotating devices. The machines are different from the present invention.

Refer to U.S. Pat. No. 4,954,303—Apparatus and process for devolatilization of high viscosity polymers, the apparatus includes a vacuum chamber atop of which the polymer is introduced, with a low shear mixer located in the vacuum chamber and a pumping device for agitating polymeric material within said vacuum zone and removing the devolatilized polymer. The apparatus is different from the system of the present invention.

As to U.S. Pat. No. 5,084,134—Process for the devolatilization of polymer solutions, by control of the ratio between thermal exchange surface and the flow per hour of the solution, flow speed in the channel, and residence time in the channel, thermosensitive polymer is purified. Such hardware design is different from design of the present invention. Refer to U.S. Pat. No. 5,453,158—Polymer devolatilizer, a flat plate heat exchanger is used to remove volatiles from polymers and this is also quite different from process and hardware design of the present invention.

U.S. Pat. No. 6,485,607—Methods for removing volatile components from polymer solutions, U.S. Pat. No. 6,627,040—Device and method for removing volatile components from polymer solutions, and Taiwanese patent No. 552,284—Method for removing volatiles from polymer solution disclose devices made from metallic material having a low iron content. Such design and the present invention are based on different principles.

After polymer synthesis, non-reactive monomers, solvents and oligomers are removed from the target polymers. Now advantages and disadvantages of prior arts and the present invention are compared as followings:

1. Most of prior arts perform devolatilization by devices such as thin-film evaporators or devolatilizing extruders. These devices include mechanical rotating components. Equipment investment cost as well as operating cost is far more higher than falling strand devolatilizers without mechanical rotating components according to the present invention.
2. Water, hydrocarbons and inert gas such as nitrogen, carbon dioxide etc. are often used as entraining agent for devolatilization in prior arts. Thus efficiency of volatile condenser is reduced and loading of the vacuum system is increased. Therefore, the cost is raised. As to the present invention, there is no need to use entraining agent.
3. Most of prior arts are continuous processes that meet requirements of mass production. For small and medium enterprise, it cost a lot to purchase such equipments. The flexibility of the continuous process may be not as good as that of the operation in a batch mode or in a quasi-continuous processing mode. Yet the present invention is applicable to a batch processing or quasi-continuous process formed by continuous batch recycles.
4. In prior arts, different types of devolatilizers are applied to polymers with different viscosities. For example, in U.S. Pat. No. 5,084,134, when the viscosity of polymer is under $10^6$ cp, it is suggested to use thin-film evaporators for devolatilization while devolatilizing extruders are applied to polymer with viscosity over $10^6$ cp. But pipelines of the devolatilizing extruder revealed in U.S. Pat. No. 4,954,303 are often stopped by accumulated polymers and the system must be shut down for periodically cleaning. Moreover, high shear effect of extruder may lead to reduction of molecular weight or particle size of polymers and this cause quality damage. The present invention do not use devolatilizing extruder.
5. Most of prior arts are related to designs of hardware, equipment material or operations. None of them provides software principle of scale-up design. There are three factors-fluid mechanics, heat transfer and mass transfer related to design of devolatilizer while fluid mechanics and mass transfer play key roles. In prior arts, relationship among the factors hasn't been established so that the scale-up design takes a lot of try and error tests. However, the present invention provides a design method of batch falling strand devolatilizers that achieve devolatilization requirements of products by a time for space approach.

SUMMARY OF THE INVENTION

Therefore it is a primary object of the present invention to provide a design method of batch falling strand devolatilizers that integrates a liquid-phase diffusion film equation or a liquid-phase diffusion pool equation with a mass balance equation for scale-up design of the batch falling strand devolatilizer volume.

It is another object of the present invention to provide a design method of batch falling strand devolatilizers that uses batch process (or quasi-continuous process) for simplifying complicated mechanisms of continuous processes and reducing cleaning of the complicated mechanisms so as to reduce cost of devolatilization processes.

It is a further object of the present invention to provide a design method of batch falling strand devolatilizers that simplifies complicated structure of devolatilizers by manufacturing processes of the batch falling strand devolatilizers so as to reduce defective products caused by complicated mechanisms of devolatilizers and increase yield.

It is a further object of the present invention to provide a design method of batch falling strand devolatilizers that uses one or a plurality of recycles to achieve a time for space approach for matching devolatilization requirements of products.

In order to achieve objects, the present invention provide a design method of batch falling strand devolatilizers having following steps: Establish a database that contains data of batch falling strand devolatilizer vs. devolatilization of at least one kind of polymer. The database includes information related to polymer viscosity, mass flow rate, recycles, stage efficiency and process efficiency. Then data in the database is substituted into a mass balance difference equation to get a backmixing parameter. When the backmixing parameter is zero or is approaching zero, a liquid diffusion stage efficiency equation having a film equation or a pool equation is integrated with the mass balance difference equation to get a devolatilization process efficiency equation. The film equation is a stage efficiency times a square root of the viscosity and is equal to a constant C1 times average exposure time of evaporation while the pool equation is a stage efficiency times a square root of the viscosity and is equal to a constant C2 times average exposure time of evaporation and plus a constant B. The devolatilization process efficiency equation is written in this form:

$$1-[1-(\text{constant C1} \times \text{average exposure time}) \times \text{viscosity}^{-1/2}/(1+\text{backmixing parameter})]^{recycles} \text{ or}$$

$$1-[1-(\text{constant C2} \times \text{average exposure time} + \text{constant B}) \times \text{viscosity}^{-1/2}/(1+\text{backmixing parameter})]^{recycles}.$$

By optimizing of a theoretical value of the backmixing parameter, a theoretical value of the process efficiency from calculation of the devolatilization process efficiency equation approaches the value of the process efficiency. Then the theoretical value of the backmixing parameter is substituted into the devolatilization process efficiency equation for performing volume design of the batch falling strand devolatilizer.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
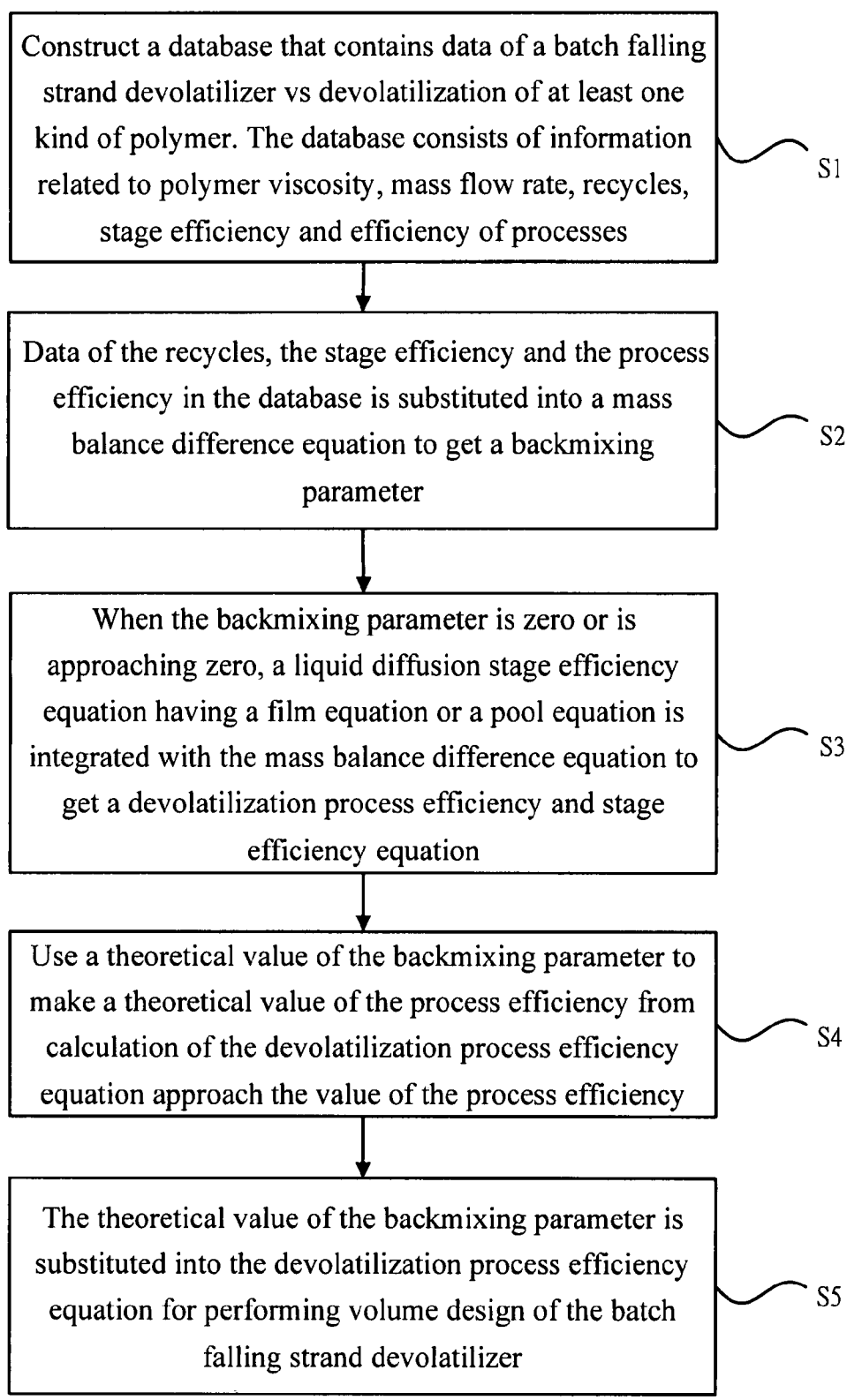
FIG. 1 is a flow chart of a design method of a batch falling strand devolatilizer according to the present invention.

At the last stage of polymer synthesis processes, a process of removing volatiles such as non-reactive monomers, oligomers, solvents and water is called devolatilization (DV). Once the polymer material contains more volatiles, its applications are affected. The polymer being devolatilized exists in melt status, only a small part thereof is in solid granular form. According to various requirements of volatiles being removed and viscosity level of polymers, various types of commercial DV equipments such as flash evaporators, falling strand devolatilizers, thin-film evaporators, single-screw extruders and twin-screw extruders are applied. Each kind of DV equipment includes a plurality of designs.

According to volatile concentrations, qualitative regimes of DV processing are divided into three categories with different mass transfer modes—(1) Free Boiling (FB or Foaming), (2) Bubble Initiation and Growth (BIG), (3) Molecular Diffusion (MD). In FB, when fluid viscosity is low and there is a remarkable gap between average partial pressure and total pressure of solvents or monomers, bubbles generate quickly and it's difficult to keep temperature constant. This falls in an operation range of the flash evaporators. In BIG stage, the viscosity is increasing and devolatilization efficiency is reduced so that mechanical devolatilizers or economical falling strand devolatilizers are suitable for this transient stage. In MD stage, viscosity is getting higher, devolatilization efficiency is lowered and temperature is easy to keep constant. Thus mechanical evaporators or economical falling strand devolatilizers are applied. Take silicon polymer processing as an example, mass transfer mechanism of the design method according to the present invention involves BIG and MD two areas that can be run inside the batch falling strand devolatilizer with economical benefits while FB mechanism is run inside a batch reactor in advance.

After achieving reaction equilibrium, degradation or neutralization of catalyst, yield of silicon polymer synthesis is about 85% and some volatile residues exist in liquid. The volatile residues are low molecular weight siloxane mixture. Depending on raw material recipes, various silicon polymers with different viscosities are synthesized. According to Mel Toub (Factors affecting silicone volatile levels in fabricated silicone elastomers, *Rubber World*, p.36-39, June, 2002), the "total silicone volatiles" means cyclic and linear polysiloxane mixture ($D_4$-$D_{10}$) that is removed by heat and vacuum. The following factors need careful evaluation with regard to scale-up design of devolitizers: (1) vacuum level: vacuum level achieved by laboratory vacuum systems may be difficult to achieve in factory operation. (2) viscosity: equipment and/or operation conditions may vary due to various viscosity of products. Robustness of the equipment and operation may be required. (3) cost: according to material output in processes, batch-type or continuous DV is chosen and so is the equipment with or without mechanical rotating device.

In accordance with above factors, a design method of batch falling strand devolatilizers according to the present invention is constructed.

A design method of batch falling strand devolatilizers according to the present invention includes following steps:

S1 Construct a database that contains data of a batch falling strand devolatilizer vs. devolatilization of at least one kind of polymer. The database consists of information related to polymer viscosity, mass flow rate, recycles, stage efficiency and efficiency of processes;

S2 Data of the recycles, the stage efficiency and the process efficiency in the database is substituted into a mass balance difference equation to get a backmixing parameter;

S3 When the backmixing parameter is zero or is approaching zero, a liquid diffusion stage efficiency equation having a film equation or a pool equation is integrated with the mass balance difference equation to get a devolatilization process efficiency and stage efficiency equation;

wherein the film equation is a stage efficiency times a square root of the viscosity and is equal to a constant C1 times average exposure time of evaporation while the pool equation is a stage efficiency times a square root of the viscosity and is equal to a constant C2 times average exposure time of evaporation and plus a constant B. The devolatilization process efficiency equation is written in this form:

$1-[1-(\text{constant } C1 \times \text{average exposure time}) \times \text{viscosity}^{-1/2}/(1+\text{backmixing parameter})]^{\text{recycles}}$ or
$1-[1-(\text{constant } C2 \times \text{average exposure time}+\text{constant } B) \times \text{viscosity}^{-1/2}/(1+\text{backmixing parameter})]^{\text{recycles}}$.

S4 Using a theoretical value of the backmixing parameter to make theoretical values of the process efficiency from calculation of the devolatilization process efficiency equation approaches the values of the process efficiency.

S5 The theoretical value of the backmixing parameter is substituted into the devolatilization process efficiency equation for performing volume design of the batch falling strand devolatilizer.

Figure 2:
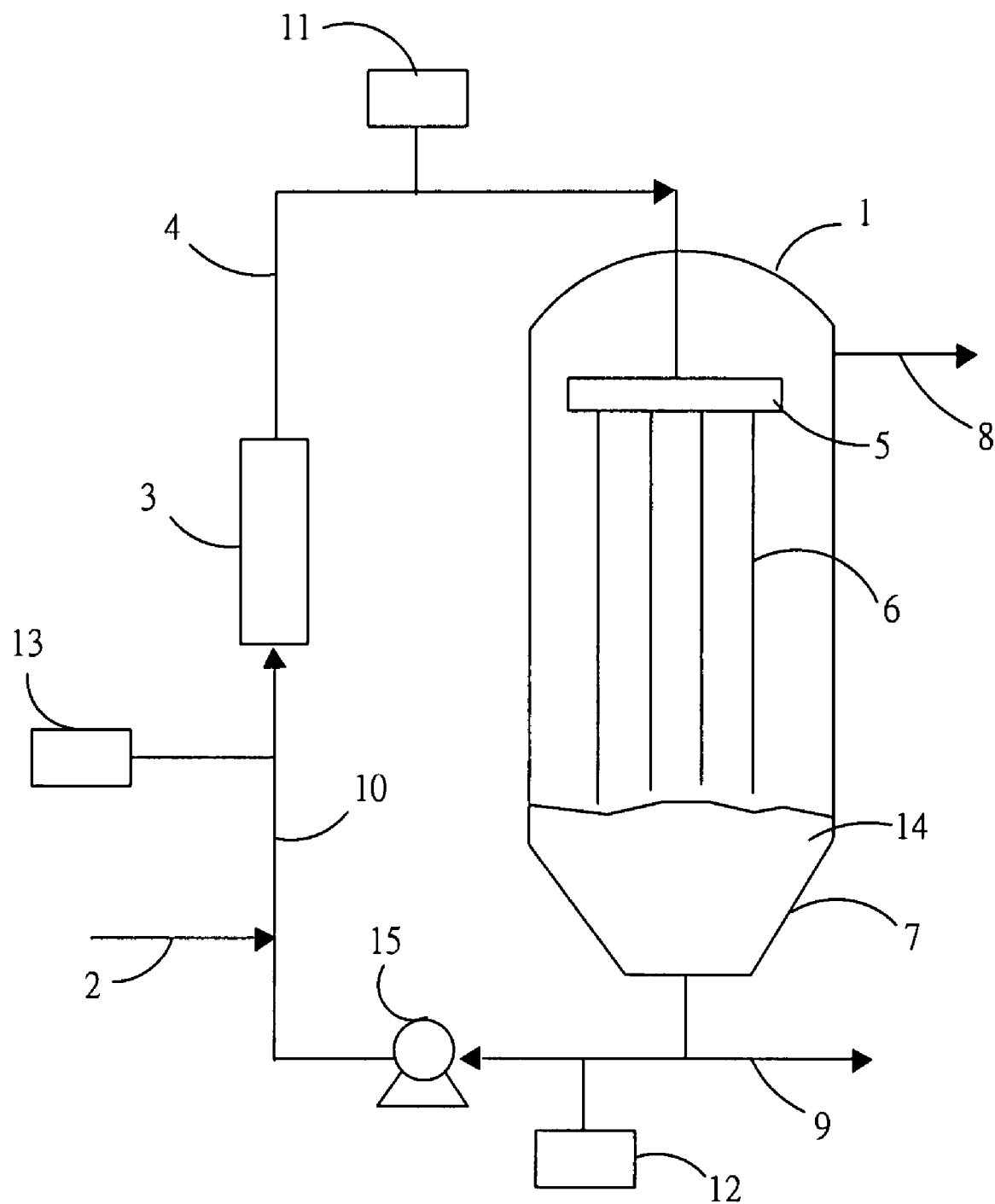
FIG. 2 is a schematic drawing showing a prototype batch falling strand devolatilizer according to the present invention.

Refer to FIG. 2, a prototype batch falling strand devolatilizer 1 is made of glass with a height of 46 cm and a diameter of 13 cm while the volume thereof is about 6 liters. After reaction, catalysis deactivation, free boiling devolatilization in a reactor (not shown), the silicone polymer solution passes through a pipeline 2, a pre-heater 3 and a pipeline 4 and the flows into a stainless splitter plate 5 (or a flow splitter, not shown in figure) of top of the prototype batch falling strand devolatilizer 1. A plurality of polymer trickle 6 is formed and is flowing into bottom 7 of the prototype batch falling strand devolatilizer 1. There are two kinds of splitter plate 5—one includes 145 holes with diameter of 2 mm suitable for low viscosity solution while the other includes 145 holes with diameter of 3 mm suitable for high viscosity fluids. By a vacuum line 8 arranged in the prototype batch falling strand devolatilizer 1, the vacuum level of the prototype batch falling strand devolatilizer 1 achieves about 30 torr. External pipelines 4, 9, 10 respectively are heated by resistances 11, 12, 13 so as to keep internal temperature of the prototype batch falling strand devolatilizer 1 at about 190.degree. C. The body of the devolatilizer are also heated by resistance. The devolatilized silicon polymer solution 14 in the bottom 7 is out from the pipeline 9 or is recycled by a transient flow pump 15 for devolatilization again.

By gravity of silicon polymer itself, silicon polymer solution is devolatilized by mass transfer mechanism under Vacuum during linear fall. During operation process, record average mass flow rate, vacuum level, volatiles amount before/after devolatilization, polymer viscosity (a bit increased after devolatilization, under the same conditions are classified into a category) and recycles. The data is shown in list one. Refer to the list one, N=1 means a sample is devolatilized only one time. N=2 means the devolatilized sample is recycled again for devolatilization, and so on. Sample weight ranges from 205 to 68260 gram, the sample is silicon polymer with volatiles ranging from 1 to 7 weight percent, viscosity range 200.about.84,000 cp and recycles from 1 to 3 times. Amount of volatiles is measure by Mettler HR73 Halogen Moisture Analyzer. Sample with weight about 5 gram is set at temperature of 150.degree. C. for 3 hours and weight loss is measured to get the amount of volatiles. The viscosity is determined by Brookfield DV–I+DV–I Prime Brookfield Viscometer at the room temperature. Under 1,000 cp, spindle S18 is used with rotational speed of 1.5.about.2 rpm while between 1,000 cp and 100,000 cp, spindle S25 is used with rotational speed of 5.about.6 rpm.

| List 1 Data of prototype batch falling strand devolatilizer while performing devolatilization of silicone polymer. | | | | | | | | |
|---|---|---|---|---|---|---|---|---|
| Nominal viscosity cP | Batch number | Flow rate g/min. | No. of recycle N | Volatiles % | | Model parameters | | |
| | | | | Before devolatilization | After devolatilization | $E_f$ | $C_{N,av}$ | $E_F$ |
| 200 | LB09 | 107~129 | 1 | 1.43 | 1.20 | 0.1608 | 0.839 | 0.161 |
| | LB10 | | 1 | 1.61 | 1.52 | 0.0559 | 0.944 | 0.056 |
| | LB01, -R1 | | 1 | 1.28 | 1.26 | 0.0156 | 0.984 | 0.016 |
| 1000 | | 52.4~130.3 | 2 | 1.26 | 0.82 | 0.3492 | 0.641 | 0.359 |
| | LB02, -R1 | | 1 | 1.52 | 1.32 | 0.1316 | 0.868 | 0.132 |
| | | | 2 | 1.32 | 1.22 | 0.0758 | 0.803 | 0.197 |
| | -R2 -R3 | | 3 | 1.22 | 0.76 | 0.3770 | 0.500 | 0.500 |
| 4500 | LB03, -R1 | 26~37.3 | 1 | 2.11 | 1.91 | 0.0948 | 0.905 | 0.095 |
| | | | 2 | 1.91 | 0.85 | 0.5550 | 0.403 | 0.597 |
| | LB04 | | 1 | 0.81 | 0.74 | 0.0864 | 0.914 | 0.086 |

-continued

List 1 Data of prototype batch falling strand devolatilizer while performing devolatilization of silicone polymer.

| Nominal viscosity cP | Batch number | Flow rate g/min. | No. of recycle N | Volatiles % Before devolatilization | Volatiles % After devolatilization | Model parameters $E_f$ | Model parameters $C_{N,av}$ | Model parameters $E_F$ |
|---|---|---|---|---|---|---|---|---|
| 9000 | LB05, | 26.1~83 | 1 | 1.69 | 1.26 | 0.2544 | 0.746 | 0.254 |
|  | -R1 |  | 2 | 1.26 | 0.71 | 0.4365 | 0.420 | 0.580 |
|  | LB06, |  | 1 | 1.71 | 1.49 | 0.1287 | 0.871 | 0.129 |
|  | -R1 |  | 2 | 1.49 | 1.32 | 0.1141 | 0.772 | 0.228 |
| 60000 | LB07 | 4.6~10 | 1 | 6.94 | 4.25 | 0.3876 | 0.612 | 0.388 |
|  | LB08 |  | 1 | 2.95 | 2.20 | 0.2542 | 0.746 | 0.254 |
| 84000 | LB11 | 4.9~6 | 1 | 1.57 | 1.02 | 0.3503 | 0.650 | 0.350 |
|  | LB12 |  | 1 | 2.09 | 1.49 | 0.2871 | 0.713 | 0.287 |
|  | LB13 |  | 1 | 1.40 | 0.78 | 0.4429 | 0.557 | 0.443 |

In list 1, $E_f$ is Stage Efficiency and is defined as $E_f$=(initial amount of volatiles−amount of volatiles after devolatilization)/(initial amount of volatiles−equilibrium amount of volatiles)  (1)

wherein the equilibrium amount of volatiles is treated as zero. $C_{N,av}$ is dimensionless average concentration of volatiles after N (number of) recycles, $C_0$ initial concentration of volatiles, $C_N$ is volatile concentration after N times of devolatilization;

$$C_{N,av}=C_N/C_0 \quad (2)$$

the relationship between $C_{N,av}$ and whole process efficiency is:

$$E_F=1-C_{N,av} \quad (3)$$

$E_F$ varies according to number of recycles N, flow field of DV operation and $E_f$ affected by mass transfer mechanism and is going to be discussed later.

Figure 3:
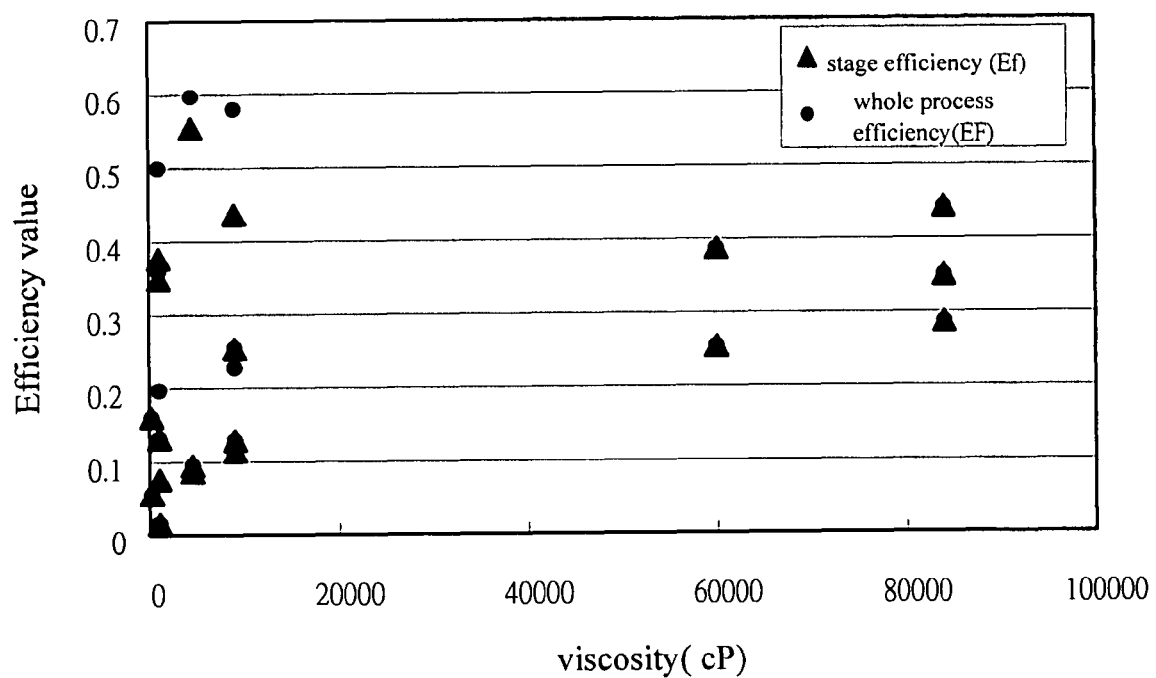
FIG. 3 is a $E_f$(stage efficiency) vs. viscosity and $E_F$ (whole process efficiency) vs. viscosity of silicon polymer graph according to the present invention.

FIG. 3 is a $E_f$ vs. viscosity and $E_F$ vs. viscosity graph, wherein $E_f$ is represented by triangle patches and $E_F$ is represented by dots. The problem is the randomness of $E_f$ vs. viscosity and $E_F$ vs. viscosity so that the data can't be used for scale-up design.

Figure 4:
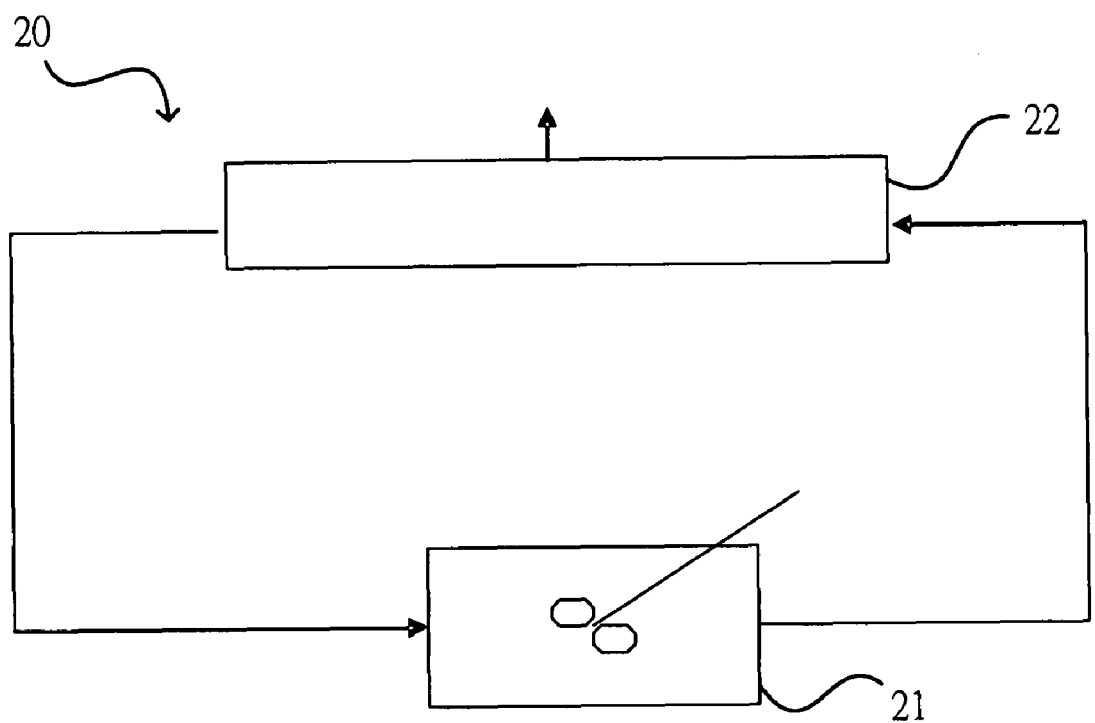
FIG. 4 is a schematic drawing of a batch loop devolatilizer.

The DV processes according to the present invention are recyclable batch-type processes. Biesenberger, J. A. and Sebastian, D. H. (*Principles of Polymerization Engineering*, Wiley-Interscience, NY, p.573-659, 1983) have revealed a batch loop devolatilizer for batch-type processes. As shown in FIG. 4, a schematic drawing of the batch loop devolatilizer is disclosed. A devolatilizer for batch operation 20 is assumed to be formed by an Ideal Mixer (IM) 21 and an evaporator 22 series-connected into a loop. "Backmixing" means that fluid in a container achieves perfect mixing. According to Oldshue, J. Y. (*Fluid Mixing Technology*, p.217, 340, McGraw-Hill, New York, 1983), perfect mixing means once material is fed into a mixer with an inlet and an outlet, it is immediately dispersed inside the mixer and the instantaneous concentration of the outlet equals to that of in the mixer. In practice, perfect homogeneous mixing is difficult to achieve. Degree of backmixing depends on ratio of fluid circulating volume to throughput. By analysis a model in FIG. 4, a difference equation is obtained and is written as:

$$E_F=1-[1-E_f/(1+M_X)]^N \quad (4)$$

Wherein N is the number of recycles, $M_X=V_M/V_f$, $V_M$ is volume of the ideal mixer, while $V_f$ is volume of the evaporator (film or pool) and $M_X$ (backmixing parameter) is the parameter that reflects influence of backmixing. The larger the $M_X$ is, the more backmixing affects the DV processes and this leads to reduction of $E_F$. On the other hand, surface renewal of the evaporator (film or pool) also has large influence. According to a mass transfer theory between gas/fluid of Sherwood, T. K., Pigford, R. L. and Wilke, C. R., (*Mass Transfer*, p.155, McGraw Hill, New York, 1975), said surface renewal means fresh liquid element performs mass transfer after contacting with surface of gas/fluid and the contact time ranging from zero to infinite is a key mechanism of devolatilization operation.

Figure 5:
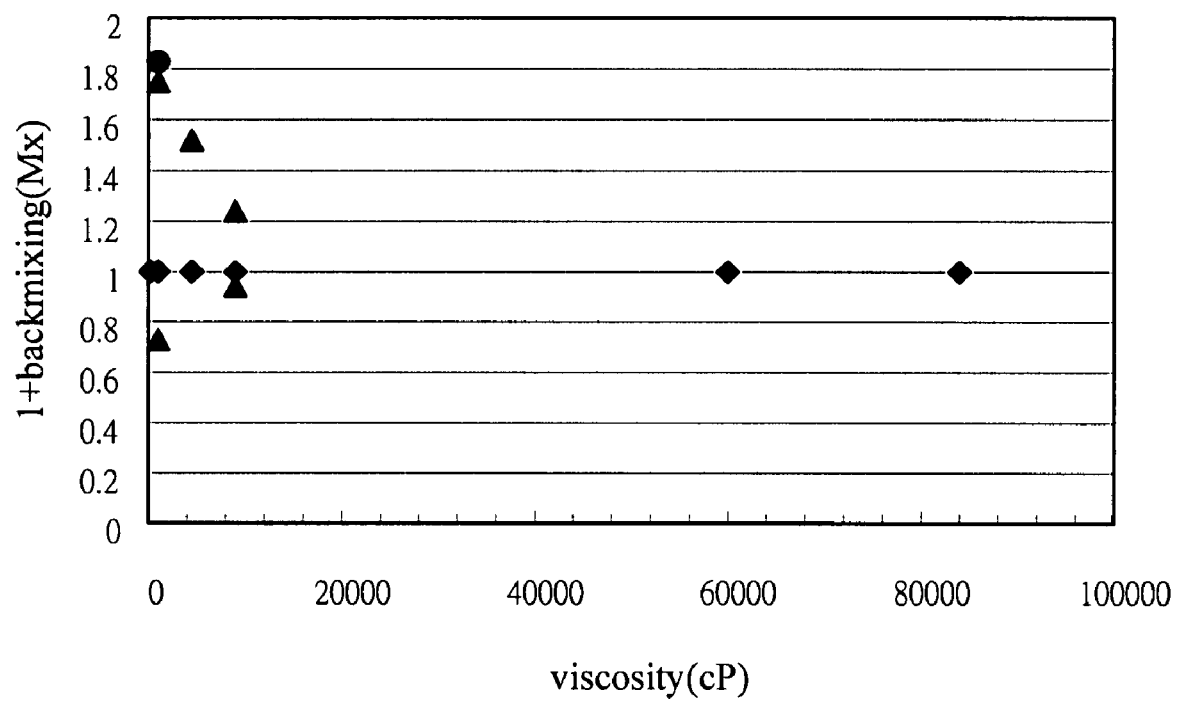
FIG. 5 is a graph showing backmixing of the batch loop devolatilizer during DV process.

In order to learn influence of backmixing during DV process, $E_F$, $E_f$ and N in list one are substituted into the equation (4) so as to get relationship between $1+M_X$ and viscosity. As shown in FIG. 5 (diamond-shaped dots, triangle patches and dots respectively represent recycle number 1, 2, 3), the $1+M_X$ values of high viscosity solution are one so that $M_X$ is zero. Therefore, when the prototype batch falling strand devolatilizer is applied to DV operation of high viscosity polysiloxanes (≧9000 cp), generally it is assumed that there is no backmixing flow field. During the DV operation, polymer fluid is purified by diffusion of the liquid-phase volatiles through mass transfer mechanism. However, as to low-viscosity polymers (<9000 cp), the influence of backmixing flow field and the corresponding reduced $E_F$ can't be neglected.

During DV operation, it is a goal to seek stage efficiency for scale-up design when volatiles are removed by liquid-phase diffusion. By mass balance, relationship between $E_f$ and mass transfer coefficient $k_c$ is:

$$E_f=\lambda_j k_c s_V \quad (5)$$

wherein $\lambda_j$ is evaporation time of the j-th stage of DV process, $k_c$ is stage average mass transfer coefficient, $s_V$ is stage area/volume ratio. During prototype DV operation, it is assumed that the surface area of polymer solution is fixed and the $s_V$ is also assumed a fixed value. It is learned that $\lambda_j$ is inversely proportional to mass flow rate of the polymer fluid:

$$\lambda_j=a_1/\text{mass flow rate} \quad (6)$$

According to penetration mass transfer theory (Sherwood, T. K., Pigford, R. L. and Wilke, C. R., *Mass Transfer*, p.154, McGraw Hill, New York, 1975), $k_c$ is proportional to square root of volatiles coefficient:

$$k_c=2[D_{AB}/(\pi t)]^{1/2} \quad (7)$$

wherein t is operation time of the film under vacuum.

Moreover, according to model of liquid diffusion coefficient $D_{AB}$ established by C. R. Wilke (Bird, R. B., Stewart, W. E. and Lightfoot, E. N., *Transport Phenomena*, Wiley, New York, pp.515, 1960), it show that $D_{AB}$ is inversely proportional to fluid viscosity μ when there is only a little amount of volatiles in fluid.

$$D_{AB} = 7.4 \times 10^{-8} (\psi_B M_B)^{1/2} T/(\mu V_A^{0.6}) \quad (8)$$

wherein $\psi_B$ is association parameter of solvent B, $M_B$ is molecular weight, T is absolute temperature, and $V_A$ is molecular volume of volatiles. As to this DV operation, other operation conditions are the same except the viscosity. Thus only the inversely relationship between $D_{AB}$ and μ is applied and substitute equations (6) (7) and (8) into equation (5) to get the following equation (9)

$$E_f \mu^{1/2} = A1/(\text{mass flow rate}) \quad (9)$$

wherein for certain polymer solution, A1 value is a constant. Data in list one is substituted into equation (9) to get FIG. 6. Compared with FIG. 3, it achieves a 0.7547 of $R^2$ relationship with A1 of 506.97. This shows importance of equation (9) in analysis of data. Other relationships are derived from this equation for scale-up design.

Mass transfer in prototype DV operation is not only through falling lines or columns, devolatilization through surface renewal also provides mass transfer for unstirred pool of the devolatilizer. Thus the mass transfer can be seen as a cooperative evaporation of the film and the pool and definition of the $\lambda_j$ in equation (6) is changed as:

$$\lambda_j = a_1/\text{mass flow rate} + b_1 \quad (10)$$

wherein $b_1$ is evaporation time of the pool of devolatilizer. Equations (10), (7), (8) are substituted in the equation (5) to get the following equation (11):

$$E_f \mu^{1/2} = A2/(\text{mass flow rate}) + B \quad (11)$$

Figure 6:
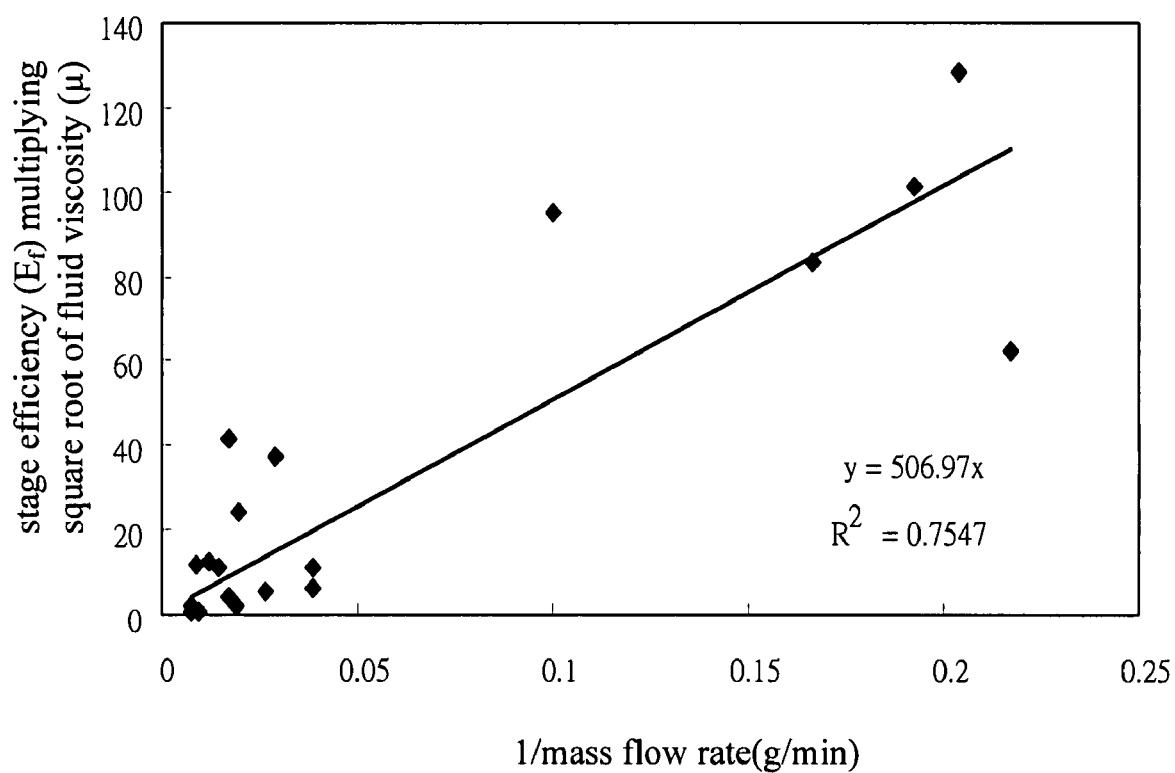
FIG. 6 is a stage efficiency ($E_f$) times square root of fluid viscosity ($\mu$) vs. mass flow rate graph of mass transfer model of a film according to the present invention.
Figure 7:
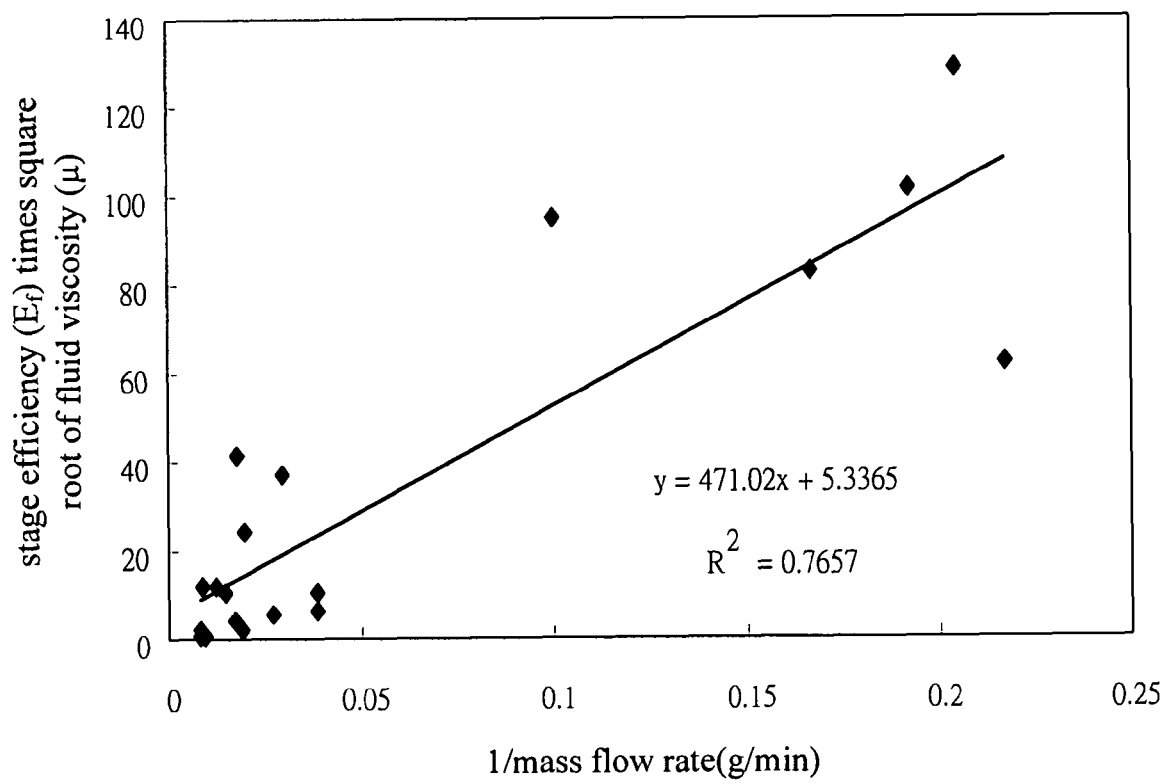
FIG. 7 is a stage efficiency ($E_f$) times square root of fluid viscosity ($\mu$) vs. mass flow rate graph of mass transfer model of a film as well as a pool according to the present invention.

Data in list 1 is again substituted into the equation (11) to get FIG. 7 and the $R^2$ value in FIG. 7 is a bit increased than that of FIG. 6 (increased from 0.7547 to 0.7657). However, such increase is not significant. This means that during DV operation, mass transfer is predominately through surface renewal of the falling strand film and mass transfer of the pool part may be neglected.

Figure 8:
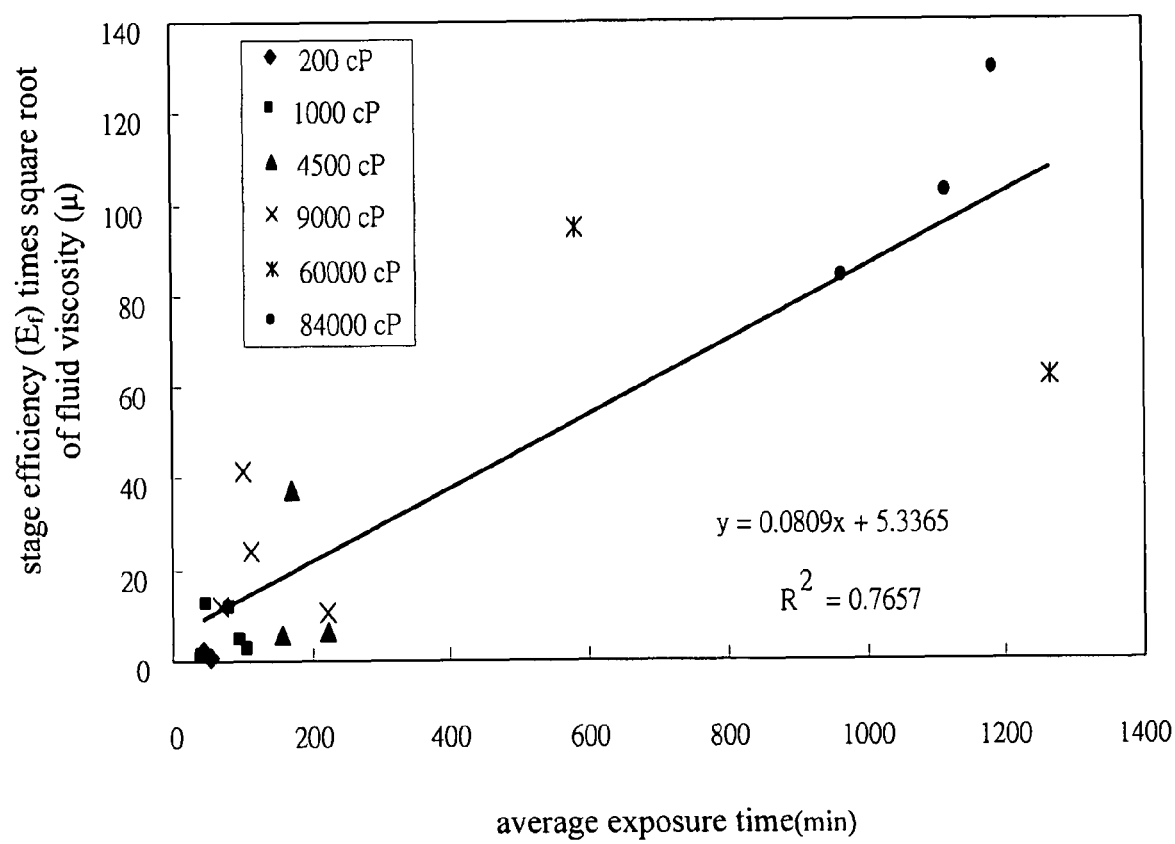
FIG. 8 is a stage efficiency ($E_f$) times square root of fluid viscosity ($\mu$) vs. average exposure time graph of mass transfer model of a film as well as a pool according to the present invention.

If the density of the silicon polymer is assumed as 0.97 g/cm (that value may vary slightly according to amount of volatiles), the average mass flow rate of the transverse axis in FIG. 7 divided by density can give average volumetric flow rate. Then the volume of the prototype devolitilizer (6000 ml) divided by the average volumetric flow rate can give average exposure time of evaporation (average residence time or space time). FIG. 8 is a re-plot of FIG. 7 with transverse axis changed to average exposure time.

It's reasonable that $R^2$ in FIG. 7 is the same with that in FIG. 8 because only transverse axis unit is changed. In conclusion, the stage efficiency $E_f$ design equation of the batch falling strand devolatilizer applied to silicon polymer is written in this form:

$$E_f = [C2\tau(\min.) + B] \mu (cP)^{-1/2} \quad (12)$$

wherein value C2 is 0.0809 and value B is 5.3365.

The equation (9) can also be converted to $$E_f = [C1\tau(\min.)] \mu (cP)^{-1/2} \quad (13)$$

wherein τ is average exposure time of evaporation of polymer solution in the evaporator and μ is viscosity of polymer fluid.

Figure 9:
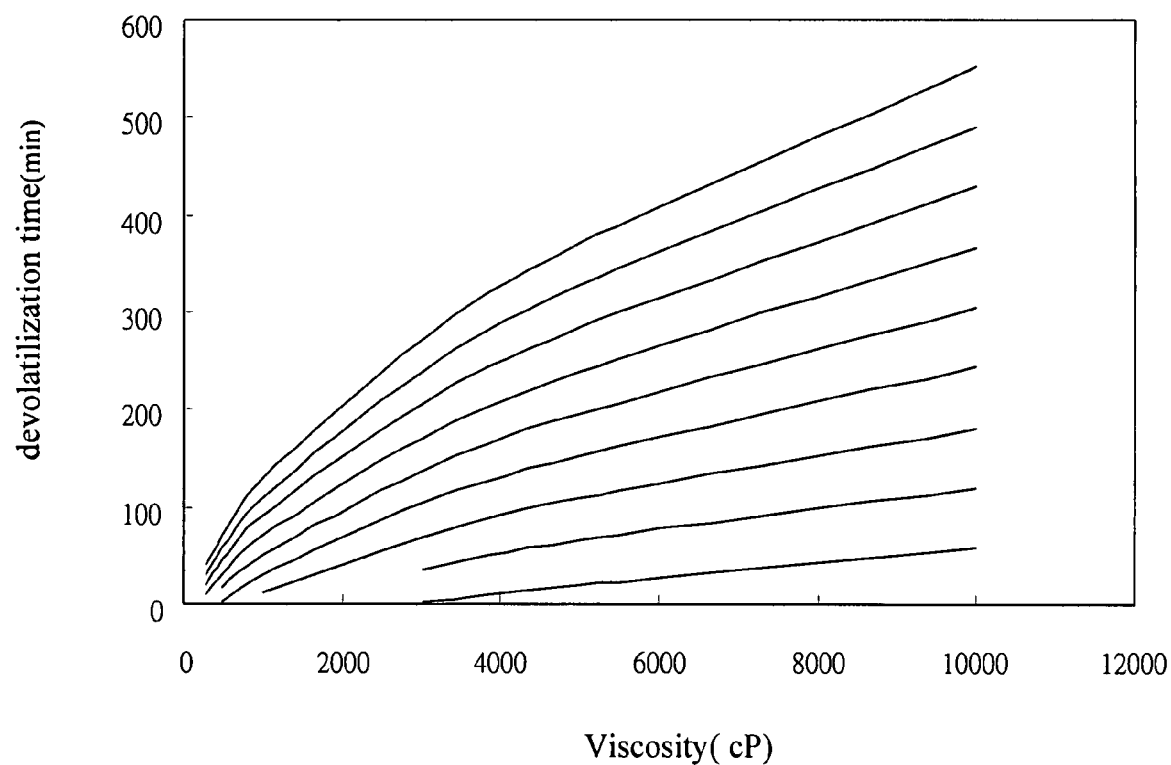
FIG. 9 is devolatilization time required vs. viscosity under different stage efficiency ($E_f$) for mass transfer model of a film as well as a pool according to the present invention.

According to equation (12), evaporation time under different viscosities is calculated. As shown in FIG. 9, once the $E_f$ is fixed, the higher the viscosity of the polymer solution is, the longer exposure time of evaporation it takes. In silicon polymer fluid with certain viscosity, if the requirement of separation efficiency of each recycle (stage efficiency $E_f$) is higher, the exposure time needs to be longer or the volume of the devolatilizer needs to be larger. In FIG. 9, the curve more upwards has higher $E_f$ value. Curves from upwards to downwards respectively have $E_f$ values of 0.5, 0.45, 0.4, 0.35, 0.3, 0.25, 0.2, 0.15 and 0.1. Besides figuring separation effect of a single stage in FIG. 9, equation (12) can also be applied to design of recycled operation of the batch falling strand devolatilizer.

Besides no mechanical movement, the advantage of the batch falling strand devolatilizer achieves requirement of specification by recycles of heat vacuum. However, each recycle increases purity of products but the purity of products is not increased linearly because the driving force of mass transfer-concentration gradient is getting smaller. Influence of different number of recycles on the whole process efficiency is shown as the equation (4)

$$E_F = 1 - [1 - E_f/(1 + M_X)]^N \quad (4)$$

It is assumed that flow field of high viscosity fluid has no backmixing, $M_X = 0$ is substituted into the equation (4) to get relationship for predicting the whole process efficiency with the surface renewal model $$E_F = 1 - (1 - E_f)^N \quad (14)$$

Figure 10:
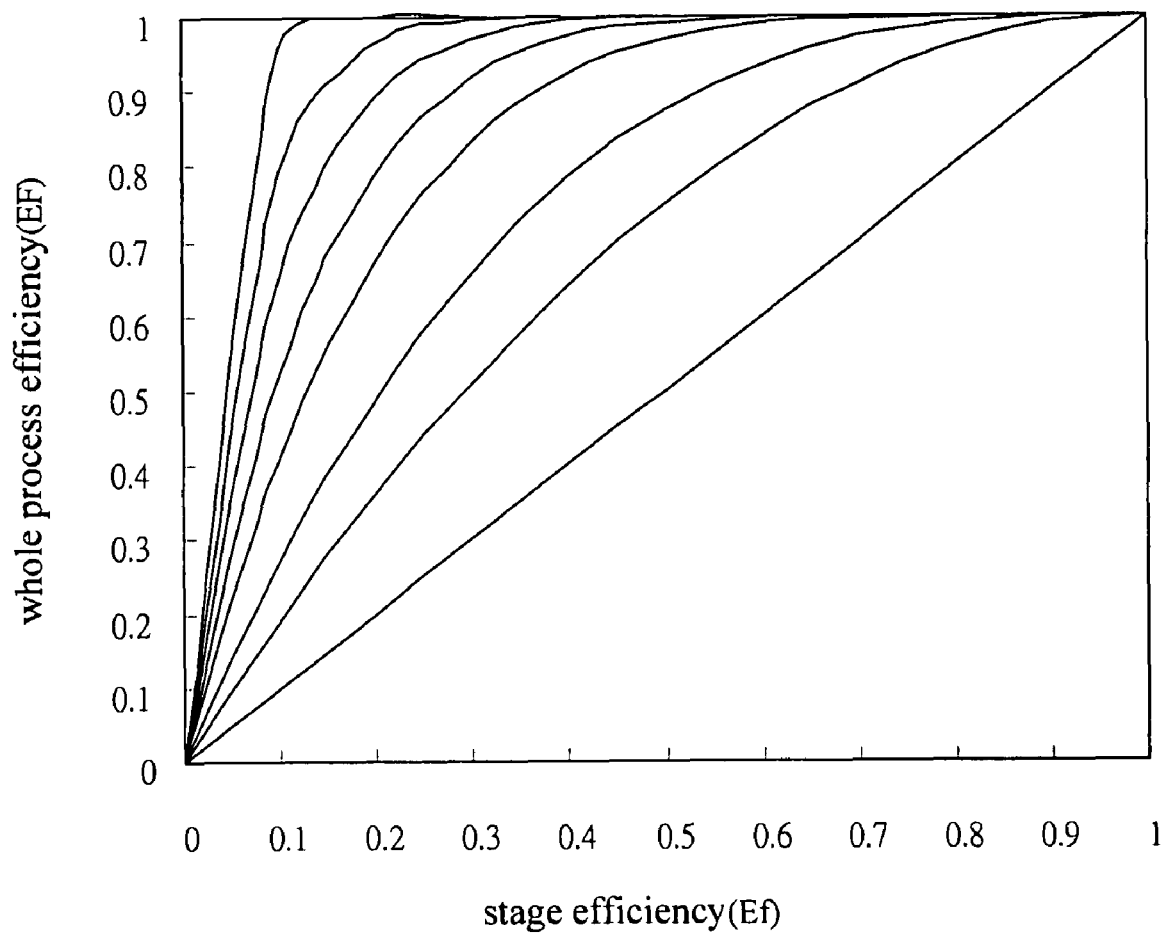
FIG. 10 is a whole process efficiency ($E_F$) vs. stage efficiency ($E_f$) graph under different numbers of recycles (N) when $M_x=0$ in mass balance difference equation.

Then by substituted $E_f$ into the equation (14), the relationship between the process efficiency and the stage efficiency under various numbers of recycles is obtained. Refer to FIG. 10, curves from upwards to downwards respectively are with N of 30, 15, 10, 7, 5, 3, 2, and 1. It is shown that increased value of N leads to rise of the $E_F$.

In FIG. 5, during DV operation, in high viscosity fluid, $M_X$ is quite small and it can be seen that backmixing flow field does not exist. Yet in low viscosity fluid, the backmixing flow field can't be neglected. Thus by changing $M_X$ and substitute the equations (13) and (12) respectively into the equation (4), devolatilization process efficiency equations (15) and (16) are obtained.

$$E_F = 1 - [1 - C1\tau\mu^{-1/2}/(1 + M_X)]^N \quad (15)$$

$$E_F = 1 - [1 - (C2\tau + B)\mu^{-1/2}/(1 + M_X)]^N \quad (16)$$

Figure 11:
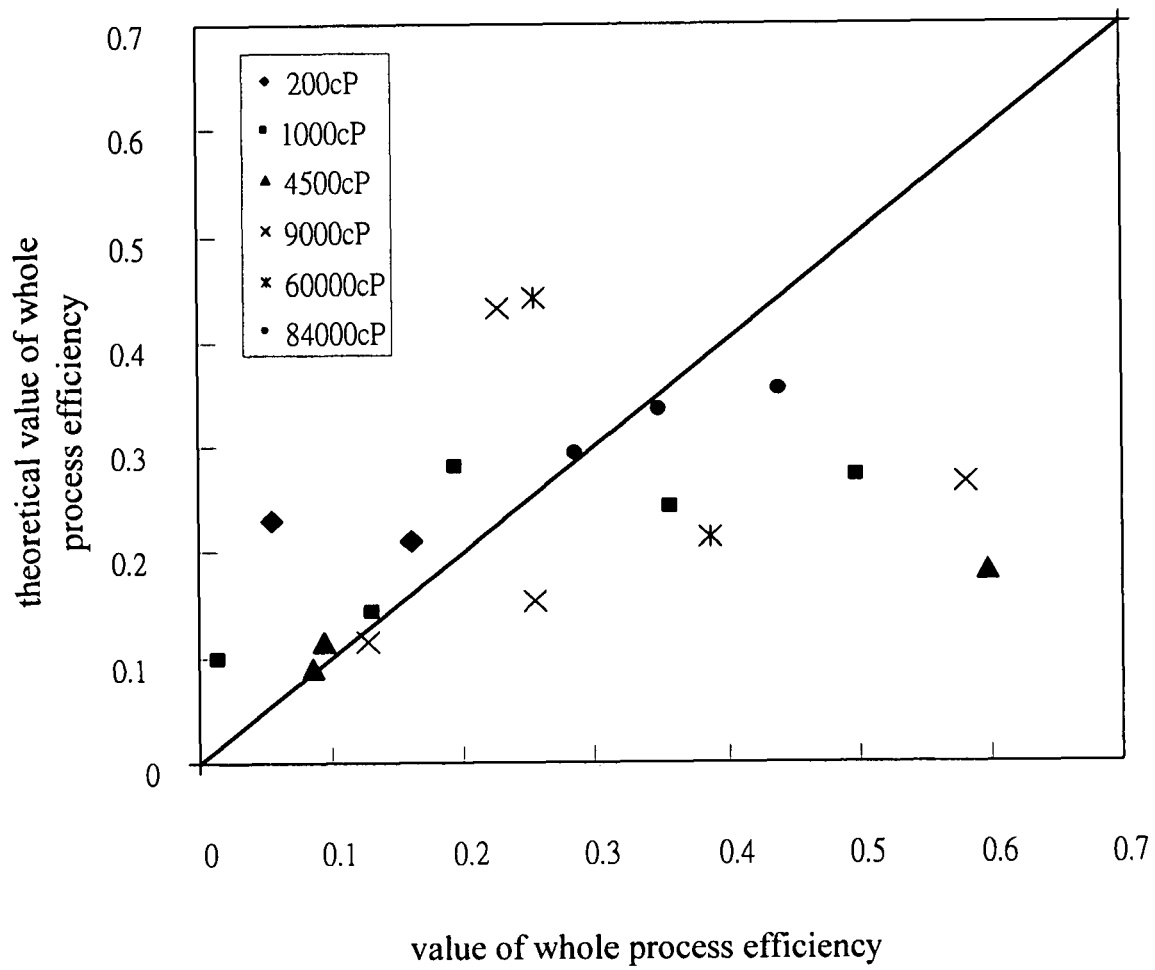
FIG. 11 is a theoretical value of process efficiency vs. real value graph under different viscosity with change of $M_x$.
Figure 12:
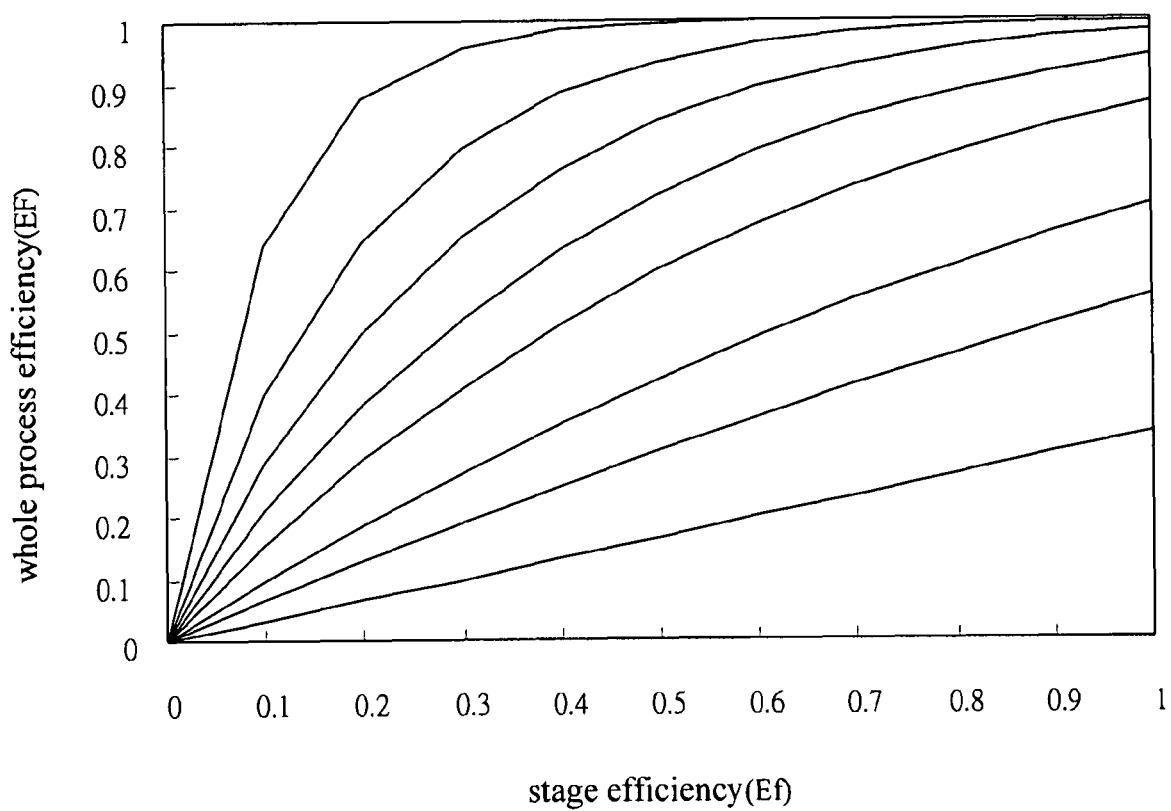
FIG. 12 is a whole process efficiency ($E_F$) vs. stage efficiency ($E_f$) graph under different numbers of recycles (N) when $M_x=2$ in mass balance difference equation.

Data in the list 1 is substituted into the equation (15) or equations (16) to get theoretical value of $E_F$ and then compared it with $E_F$ value in the list 1. It is found that when fluid viscosity is high (≧9000 cp), once $M_X = 0$, the value of process efficiency approaches theoretical value thereof. When fluid viscosity is low (<9000 cp), once $M_X = 2$, the value of process efficiency approaches theoretical value thereof. The result of comparison is shown in FIG. 11. Theoretical value of $E_F$ approaches experimental value of $E_F$ by change of $M_X$ and this matches data and physical phenomena in FIG. 5. The values can be obtained by above method of try and error or optimal commercial application programs. Refer to FIG. 12, this graph corresponds to FIG. 10 showing calculation results of $M_X = 2$. Compare FIG. 12 (curves from upwards to downwards respectively are with N of 30, 15, 10, 7, 5, 3, 2, and 1) with FIG. 10, it is obvious under the same stage efficiency, backmixing flow field ($M_X = 2$) reduces the process efficiency. Therefore, design of parameters such as volume or number of recycles of the batch falling strand devolatilizer according to the present invention can refer to the equation (15) or equation (16).

Embodiment 1

After finishing free boiling stage of devolatilization in the chemical reactor, the 5% silicon volatiles inside the silicon polymer with viscosity of 80000 cP is required to be reduced into 1.5% by 2000 g/min mass flow rate.

From above analysis, it is learned that $M_X=0$ when the viscosity is 80000 cP. Thus the design is processed according to FIG. 10 and the result is show in List 2.

$C_{N,av}=0.015/0.05=0.3$, $E_F=1-C_{N,av}=0.7$,
$E_f=(0.0809\ T+5.3363)/80000^{0.5}=2.86\ E-4\ T+0.0189$, volume of devolatilizer is calculated by $2000T/0.97/1000$.

List 2 Parameters for design of a batch falling strand devolatilizer with 80000 cP silicon polymer therein.

| T, min | $E_f$ | N(estimated by $M_x = 0$) | Volume, liter |
| --- | --- | --- | --- |
| 10 | 0.02174 | 55 | 21 |
| 50 | 0.0332 | 36 | 103 |
| 100 | 0.0475 | 25 | 206 |
| 200 | 0.0761 | 15 | 412 |
| 500 | 0.1619 | 7 | 1031 |
| 1000 | 0.3049 | 3 | 2062 |

It is learned that preset target of devolatilization can be achieved by small volume with multiple recycles or large volume with fewer recycles.

Embodiment 2

After finishing free boiling stage of devolatilization in the chemical reactor, the 6% silicon volatiles inside the silicon polymer with viscosity of 1000 cP is expected to be reduced into 1% by 5000 g/min mass flow rate.

From above analysis, it is learned that $M_X=2$ when the viscosity is 1000 cP. Thus the design is processed according to FIG. 12 and the result is show in List 3.

$C_{N,av}=0.01/0.06=0.167$, $E_F=1-C_{N,av}=0.833$,
$E_f=(0.0809\ T+5.3363)/1000^{0.5}=2.56\ E-3\ T+0.169$, volume of devolatilizer is calculated by $5000\ T/0.97/1000$.

List 3 Parameters for design of a batch falling strand devolatilizer with 1000 cP silicon polymer therein

| T, min | $E_f$ | N(estimated by $M_x = 2$) | Volume, liter |
| --- | --- | --- | --- |
| 10 | 0.1946 | 27 | 52 |
| 50 | 0.297 | 17 | 258 |
| 100 | 0.425 | 12 | 515 |
| 200 | 0.681 | 7 | 1031 |
| 300 | 0.937 | 5 | 1546 |

Similarly, it is learned from the list 3 that the preset extent of devolatilization can be achieved by small volume with multiple recycles or large volume with fewer recycles. And the operation conditions are modified according to requirements of cost and labor.

In summary, a design method of batch falling strand devolatilizers according to the present invention has following advantages:

1. The present invention provides a liquid diffusion film equation or a liquid diffusion pool equation integrated with a mass balance difference equation for scale-up design of the batch falling strand devolatilizer.
2. By batch-type process or quasi-continuous processing composed of continuous batch recycles, complicated mechanism of continuous devolatilization processes is simplified and cleaning of the complicated mechanisms is also reduced so that cost of devolatilization processes is down.
3. By design of manufacturing processes of the batch falling strand devolatilizers according to the present invention, complicated structure of devolatilizers is simplified. Thus defective products caused by complicated mechanisms of devolatilizers is reduced and the yield is improved.
4. By one or a plurality of recycles, a time for space approach is applied for achieving devolatilization extent of products.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A design method of batch falling strand devolatilizers comprising the steps of: constructing a database that contains data of batch falling strand devolatilizer vs. devolatilization of at least one kind of polymer and the database having information related to polymer viscosity, mass flow rate, number of recycles, stage efficiency and process efficiency; data of the number of recycles, the stage efficiency and the process efficiency in the database is substituted into a mass balance difference equation to get a backmixing parameter; when the backmixing parameter is zero or is approaching zero, a liquid diffusion stage efficiency equation having a film equation or a pool equation is integrated with the mass balance difference equation to get a devolatilization process efficiency equation; wherein the film equation is a stage efficiency times a square root of the viscosity and is equal to a constant C1 times average exposure time of evaporation while the pool equation is a stage efficiency times a square root of the viscosity and is equal to a constant C2 times average exposure time of evaporation and plus a constant B; and wherein the devolatilization process efficiency equation is written in this form:

$1-[1-(\text{constant C1} \times \text{average exposure time}) \times \text{viscosity}^{-1/2}/(1+\text{backmixing parameter})]^{recycles}$ or $1-[1-(\text{constant C2} \times \text{average exposure time} + \text{constant B}) \times \text{viscosity}^{-1/2}/(1+\text{backmixing parameter})]^{recycles}$;

making a theoretical value of the process efficiency from calculation of the devolatilization process efficiency equation approach the value of the process efficiency by means of a theoretical value of the backmixing parameter; and substituting the theoretical value of the backmixing parameter into the devolatilization process efficiency equation for performing volume design of the batch falling strand devolatilizer.

2. The design method as claimed in claim 1, wherein in the step of constructing a database that contains data of batch falling strand devolatilizer vs. devolatilization of at least one kind of polymer and the database having information related to polymer viscosity, mass flow rate, number of recycles, stage efficiency and process efficiency, wherein the stage efficiency is defined as initial amount of volatiles minus amount of volatiles after devolatilization and then divided by the initial amount of volatiles.

3. The design method as claimed in claim 1, wherein in the step of constructing a database that contains data of batch falling strand devolatilizer vs. devolatilization of at least one kind of polymer and the database having information related to polymer viscosity, mass flow rate, number of recycles, stage efficiency and process efficiency, wherein the process efficiency is equal to initial concentration of volatiles minus volatile concentration after N times of devolatilization and then divided by the initial concentration of volatiles.

4. The design method as claimed in claim 1, wherein the data of the recycles, the stage efficiency and the process efficiency in the database is substituted into the mass balance difference equation to get a graph of one plus the backmixing parameter vs. polymer viscosity in the step of getting the backmixing parameter.

5. The design method as claimed in claim 1, wherein the film equation is obtained by integration of an equation—the stage efficiency times square root of the viscosity equals to a constant A1 divided by mass flow rate, polymer density and volume of the batch falling strand devolatilizer.

6. The design method as claimed in claim 5, wherein the equation—the stage efficiency times square root of the viscosity equals to a constant A1 divided by mass flow rate is obtained by integration of a liquid diffusion equation—$E_f = \lambda_j k_c s_v$, $\lambda_j = a_1/\text{mass flow rate}$, $k_c = 2[D_{AB}/(\pi t)]^{1/2}$ and $D_{AB} = 7.4*10^{-8} (\psi_B M_B)^{1/2} T/(\mu V_A^{0.6})$ and the $E_f$ is the stage efficiency, $\lambda_j$ is evaporation time of the j-th stage of the devolatilization process, $k_c$ is stage average mass transfer coefficient, $s_v$ is stage area/volume ratio, $a_1$ is constant of the film, $D_{AB}$ is volatiles diffusion coefficient, $\pi$ is a constant representing the ratio of the circumference of a circle to its diameter, t is operation time of the film under vacuum, $\psi_B$ is association parameter of solvent B, $M_B$ is molecular weight, T is absolute temperature, and $V_A$ is molar volume of volatiles.

7. The design method as claimed in claim 1, wherein the pool equation is obtained by integration of a equation—the stage efficiency times square root of the viscosity equals to a constant A2 divided by mass flow rate and then plus a constant B, polymer density and volume of the batch falling strand devolatilizer.

8. The design method as claimed in claim 7, wherein the equation—the stage efficiency times square root of the viscosity equals to a constant A2 divided by mass flow rate and then plus a constant B is obtained by integration of a liquid diffusion equation—$E_f = \lambda_j k_c s_v$, $\lambda_j = a_2/\text{mass flow rate} + b$, $k_c = 2[D_{AB}/(\pi t)]^{1/2}$ and $D_{AB} = 7.4*10^{-8} (\psi_B M_B)^{1/2} T/(\mu V_A^{0.6})$ while $E_f$ is the stage efficiency, $\lambda_j$ is evaporation time of the j-th stage of the devolatilization process, $k_c$ stage average mass transfer coefficient, $s_v$ is stage area/volume ratio, $a_2$ is constant of the film, b is pool constant, $D_{AB}$ is volatiles diffusion coefficient, $\pi$ is a constant representing the ratio of the circumference of a circle to its diameter, t is operation time of the film under vacuum, $\Psi_B$ is association parameter of solvent B, $M_B$ is molecular weight, T is absolute temperature, and $V_A$ is molar volume of volatiles.

9. The design method as claimed in claim 1, wherein data of the polymer viscosity and the mass flow rate in the database is substituted into the film equation and the pool equation and then take either the film equation or the pool equation with higher stage efficiency as the liquid diffusion stage efficiency equation.

* * * * *